United States Patent
Waters, Sr.

(10) Patent No.: US 6,264,273 B1
(45) Date of Patent: Jul. 24, 2001

(54) AIRCRAFT ARMREST AND COCKPIT ORGANIZER ASSEMBLY

(76) Inventor: Joe Cleveland Waters, Sr., 104 W. Lynne Dr., Martinez, GA (US) 30907

( * ) Notice: Subject to any disclaimer, the term of this patent is extended or adjusted under 35 U.S.C. 154(b) by 0 days.

(21) Appl. No.: 09/225,230

(22) Filed: Jan. 4, 1999

(51) Int. Cl.[7] .................................................. A47C 7/62
(52) U.S. Cl. .............................. 297/188.14; 297/188.21
(58) Field of Search ....................... 297/188.14, 188.17, 297/188.16, 188.19, 188.2, 188.21, 217.3, 217.4

(56) References Cited

U.S. PATENT DOCUMENTS

| | | | |
|---|---|---|---|
| 5,390,976 | * 2/1995 | Doughty et al. | 297/188.19 X |
| 5,489,054 | * 2/1996 | Schiff | 297/188.14 X |
| 5,524,958 | * 6/1996 | Wieczorek et al. | 297/188.17 |
| 5,556,017 | * 9/1996 | Troy | 297/188.01 X |
| 5,562,331 | * 10/1996 | Spykerman et al. | 297/188.19 X |
| 5,800,011 | * 9/1998 | Spykerman | 297/188.19 |

*Primary Examiner*—Peter M. Cuomo
*Assistant Examiner*—Stephen Vu

(57) ABSTRACT

A multiple unit assembly designed to address the problem of fatigue faced by pilots of small aircraft that are not equipped with a center armrest whereby pilots and passengers can travel more comfortably and safely. The armrest opens and closes to provide a Flight Accessory Box for convenient storage of navigation supplies such as flashlights, pens, eyeglasses, etc. An adjustable, convenient, and detachable holder for maps, charts, electronic navigational aids (computers, GPSs, lorans, moving maps, etc.), fits onto a drink Cup Holder Assembly that retracts into the armrest (Flight Accessory Box). A retractable, reversible, variable sized drink Cup Holder Assembly fits into the armrest so the pilot as well as the front and back seat passengers can travel more safely and comfortably and avoid spillage. An optional two-Cup Holder Assembly fits onto an armrest and flight accessory box to accommodate additional cups. The assembly features two mounting base designs, one for aircraft that have a raised center console between the front seats and another for aircraft that have a flat floor. Special spring loaded latches fit underneath the T-Shaped Seat Tracks providing a secure, safe and steadfast fit.

7 Claims, 11 Drawing Sheets

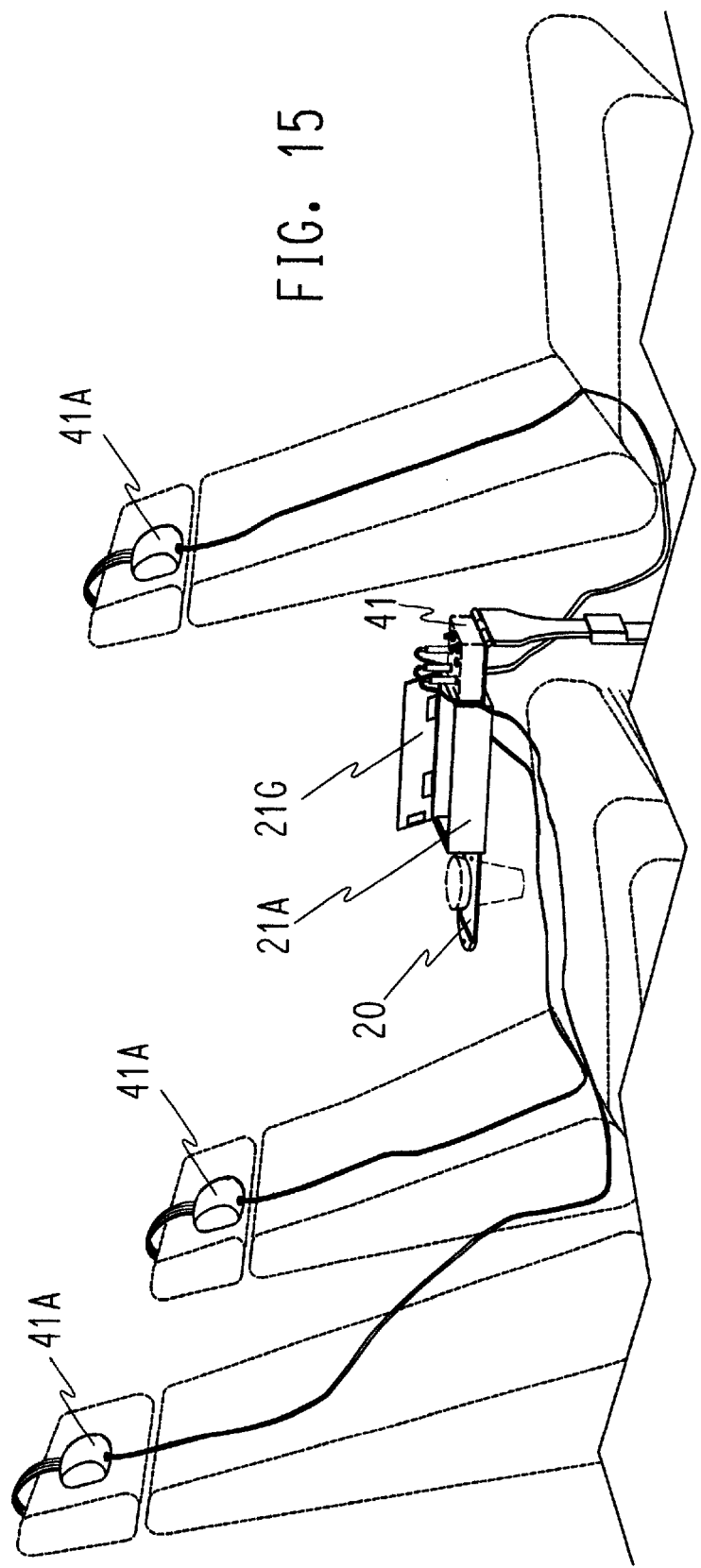

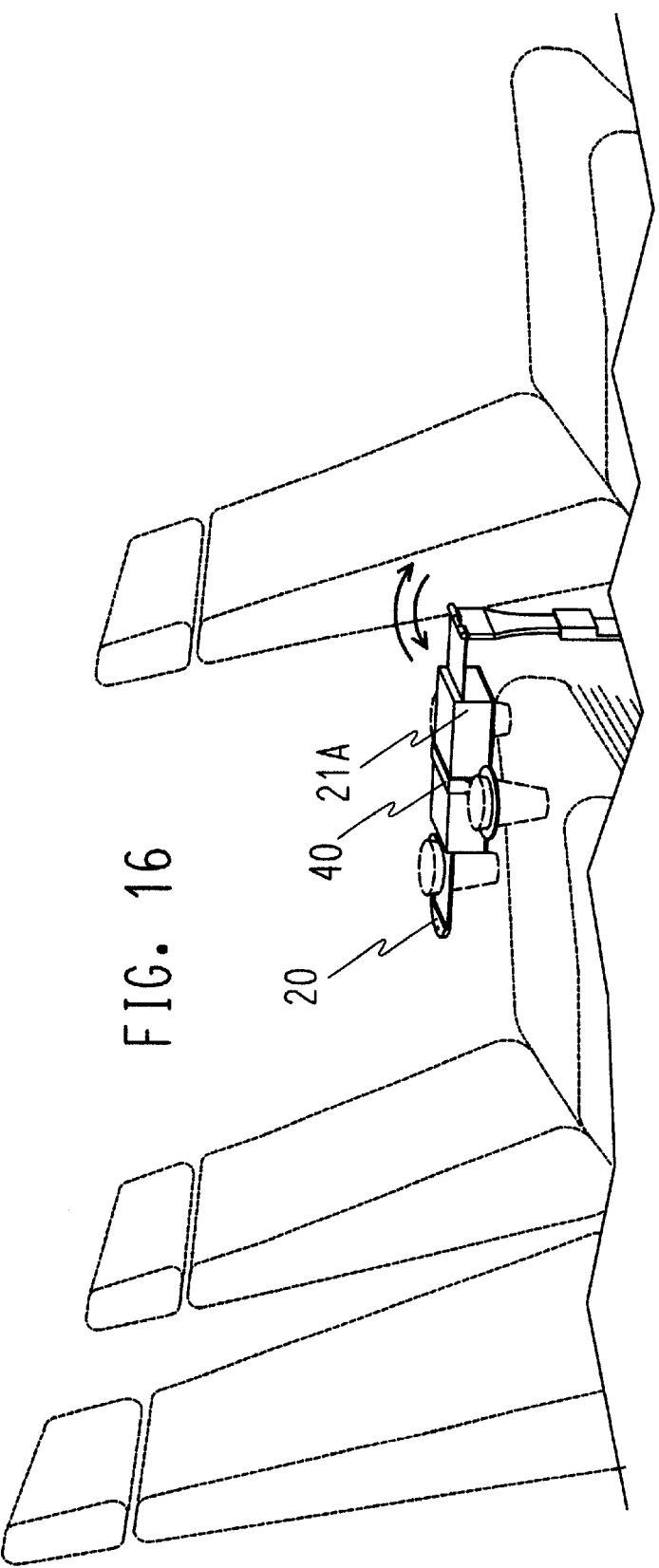

AIRCRAFT ARMREST AND COCKPIT ORGANIZER ASSEMBLY

CROSSREFERENCE TO RELATED APPLICATIONS

Wieczorek et al (U.S. Pat. No. 5,524,958), Troy U.S. Pat. No. 5,556,017, Doughty et al (U.S. Pat. No. 5,390,976), Schiff (U.S. Pat. No. 5,489,054), Spykerman (U.S. Pat. No. 5,800,011), and Spykerman et al (U.S. Pat. No. 5,562,331).

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

Piloting a small aircraft requires a high degree of concentration and organization. It is important to have all navigational aids, e.g. maps charts, and electronic devices, e.g., computers, portable GPS's, moving maps, lorans, etc., readily accessible and available to the pilot for safe flight.

Avoiding fatigue is something that all conscientious pilots attempt to do as fatigue impedes one's performance. Some makes and models of small aircraft with two front seats have standard wall mounted and door mounted armrests that are designed for the pilot's left arm and the front passenger's right arm. However, no such planes have interrelated multiple use devices as depicted in my invention which includes a portable floor mounted armrest that fits between the front seats for the pilot's right arm and the passenger's left arm.

Pilots must be alert and have in-flight navigational aids, tools and accessories readily accessible and conveniently located. These aids may include pens, pencils, eyeglasses, eye shades, flashlights (for night flights), Allen wrenches (for radio knobs that sometime come off during flight), screw drivers, wrenches, tape, batteries, etc.

Distractions for a pilot can have serious and even fatal consequences. Small aircraft generally do not come equipped with drink cup holders and consequently, there is no suitable place for open drinks except for one's hand. As a general rule, spillage and sometimes breakage is almost assured if open beverages drinks are used during flight in a small aircraft. Spillage and breakage can cause major distractions to a pilot.

Cockpit space is very limited in small aircraft. It is often desirable and necessary for pilots, copilots, and passengers to utilize multiple place portable intercom devices for effective communication. Since these accessories are optional (not built-in), there is no convenient place for them and consequently, they are often placed on the console or floor where they are stepped on or kicked around. These devices sometimes are laid on the seat and the wires often become entangled. This assembly provides a convenient and easily accessible mounting platform for positioning and supporting such intercom devices, thereby minimizing distractions and maximizing organization.

My newly invented Aircraft Armrest/Flight Accessory Box Assembly, Console and Flat Floor Support Assembly, Drink Cup Holders, and Adjustable Map and Electronic Device Holder, addresses problems of fatigue, pilot disorganization, and distraction. It is toward the resolution of those problems that have not been solved by prior art that my present invention is directed.

To my knowledge, no one anywhere in the world has ever invented or produced an interrelated multiple use device consisting of an aircraft Armrest/Flight Accessory Box Assembly, Console and Flat Floor Support Assembly, Drink Cup Holders (Retractable and External), Adjustable Map and Electronic Device Holder, and Mounting Platform for Multiple Place Portable Intercom Devices.

It is believed that my invention is distinctly different from all of the references cited i.e., Wieczorek et al (U.S. Pat. No. 5,524,958), Troy U.S. Pat. No. 5,556,017, Doughty et al (U.S. Pat. No. 5,390,976), Schiff (U.S. Pat. No. 5,489,054), Spykerman (U.S. Pat. No. 5,800,011), and Spykerman et al (U.S. Pat. No. 5,562,331) and that none of the above anticipated the art claimed in my application for the following reasons:

My application, which consists of an aircraft armrest/flight accessory box assembly, console and flat floor support assembly, drink cup holders, adjustable map, chart, and electronic device holder, and mounting platform for multiple place portable intercom devices, shown in FIGS. 1–5, has little or no similarity to that of Wieczorek et al nor other cited references.

The design features of my invention were intended to resolve problems associated with pilot fatigue and flight safety, aircraft organization, storage, and improving communications between the pilot, co-pilot and passengers.

None of the devices in the cited references are designed for, adaptable to, or intended for small aircraft. They are all designed for automobile application. The physical structure, construction materials, design requirements, specifications, components, space limitations, service and general equipment needs are different for automobiles and aircraft. Likewise, the purposes of communications equipment differ as well as licensing requirements, for aircraft and pilots. The environments, within which aircraft and pilots operate, are all very different. Therefore, there are little or no relationship aircraft and automobile parts.

Automobile and aviation parts have different design and specification criteria and these parts cannot be legally interchanged. For example, there are rigid weight and balance criteria that must be taken into consideration as total weight and weight distribution affects flight safety and determines whether an airplane can fly or not. Further, all non-metallic materials i.e., cockpit appointments must be rated and certified as being flame proof or flame retardant. An example of this difference is when one replaces the upholstery or carpet in an aircraft, there must be written certification from the manufacturer that the replacement materials are flame proof. Additionally, their installation has to be done or at least validated by a licensed mechanic who is certified by the Federal Aviation Administration.

The automobile and aviation industry is regulated by separate governmental agencies. Automobile parts do not meet the more rigid specifications required for aircraft parts. None of the cited art anticipated aviation needs.

Aircraft and automobiles have completely different travel constraints. In the background of the invention for the automotive cup holder, Wieczorek's et al invention specifies that their device was useful for "a short cross town commute or a trip of longer duration". In contrast, my invention addresses cockpit space constraints, in-flight organizational needs, and offers a device to assure safe and comfortable travel in small aircraft for short and long flights. Pilots of small aircraft, which have very small cockpits, have difficulty recovering dropped or lost pens, pencils, flashlights, flight computers, or other navigational aids, and as a result, sometimes find it necessary to land prematurely, which can increase safety risks.

Pilots do not share the same ability that automobile drivers have, that is, the ability to stop by the roadside to search for lost items or for a brief walk to recover from fatigue. Pilots who fly alone often place a suitcase on the front passenger's seat to lean on since most small aircraft only provide a left armrest for the pilot and he/she have nothing to lean upon and rest their right arm. Therefore, my invention is intended to improve pilot and passenger comfort, as well as cockpit organization.

None of the cited references are designed nor intended for frequent removal or detachment each time the vehicle is used. My invention, out of necessity, is designed to be portable and detachable in whole or in part individual component.

Unlike all cited references, my invention is intended to be either manipulated, moved, detached, assembled or disassembled with each boarding and use of the aircraft due to the cockpit's space limitations and specific flight plan needs.

Unlike all cited references, my invention covers both major designs in small aircraft i.e., low wing and high wing configurations. Each wing configuration results in a different floor contour and requires a different support assembly design as illustrated in FIGS. 13, 14.

Many small aircraft have low wings, which protrude from the lower side of the fuselage. Such aircraft generally have a "carry through tunnel", protruding from the cockpit floor that houses or encloses flight control cables, wiring, electronic components, etc. This tunnel, or hump in the floor of the aircraft, creates an arch which is accommodated by the shape of my floor console's armrest/flight accessory box support assembly FIG. 1 (22, 27). Furthermore, my device requires only two (2) sleeve latch assemblies FIG. 1 (30) to stabilize and secure it in place. There are no comparative aircraft design features present in automobiles and consequently, none of the cited references anticipated or addressed these design differences with respect to their art.

The other common wing configuration is at the top of the fuselage and above the heads of the passengers. Aircraft with overhead wings generally have flat cockpit floors since flight control cables, wiring, electronic components, etc., are encased overhead. To accommodate this design, my flat floor armrest support FIGS. 5 (32) has four (4) sleeve latch assemblies FIG. 6 (30) to hold it and secure it in place.

Automobiles do not have floor mounted T shaped seat tracts FIGS. 3, 5, 13, 14 (31) as do small aircraft. These seat tracks accommodate the sleeve latch assemblies FIGS. 3, 5 (30) by securing and stabilizing the entire device. None of the cited references, for example, use automobile seat rails to secure their devices in place and none have similar spring loaded sleeve latch assemblies (30) that permit instant easy installation and removal.

My invention neither compromise the safety or access to flight controls nor the structural integrity of the aircraft's fuselage. All of the cited references for automobile armrests are incompatible with small aircraft's structural design features as well as their functional and safety requirements.

Unlike automobiles, having two or more doors, small aircraft with low wings generally have only one door for boarding. To board low winged aircraft, the pilot must step over the right front passenger's seat and flight controls between the front seats to occupy the pilot's seat.

A permanently installed armrest, bearing any similarity to the automobile armrests in the cited references, would interfere with, or prevent the pilot's boarding of the aircraft. Devices similarity to automobile armrests in the cited references would be either impractical or unsafe for aircraft application.

My invention is designed specifically to avoid creating additional aircraft boarding difficulties in three (3) ways; 1) The armrest/flight box assembly FIG. 1 (21) can be detached temporarily and lifted from between the front seats and placed aft out of the pilot's way. 2) The armrest/flight box assembly can be raised up and rotated to its rear seat position out of the pilot's way as illustrated in FIG. 15, or, 3) The armrest/flight box assembly can be flipped over out of the pilot's way without removing the armrest from the armrest/flight box support assembly as illustrated in FIG. 16. However, the adjustable map, chart, and electronic device holder FIGS. 13, 14, 15 (18) must be detached before flipping the armrest/flight box assembly to the rear seat position as shown in FIG. 16.

My aircraft armrest/flight accessory box FIG. 2 (21A) and lid FIG. 2 (21G), which will normally be covered with an upholstered cushion, is designed to hold small flight and navigation instruments and equipment. These flight instruments and equipment have no use or application in automobiles and are not routinely kept in automobiles. Consequently, none of the cited art addressed or anticipated the need for an aircraft armrest/flight accessory box.

My aircraft armrest/flight accessory box FIG. 2 (21A) opens only to the side nearest the pilot. Accordingly, the lid FIG. 2 (21G) of the aircraft armrest/flight accessory box is hinged differently FIG. 2 (21H, 21I, 21J) than all the cited references. Lids hinged at the front and opening as shown in Doughty's et al art would interfere with the pilot's ability to use essential flight controls.

Unlike all cited references, my aircraft armrest/flight accessory box and lid FIG. 2 (21A, 21G) serves as the base for the aircraft armrest, which is a primary purpose of the invention. Also, the lower portion of the aircraft armrest/flight accessory box FIG. 9 (21A) serves as a storage port for housing the retractable drink cup holder assembly FIGS. 8, 9 (20) which can be slid out to hold a drink cup.

Unlike all cited references (except for Wieczorek et al), the use of my aircraft armrest/flight accessory box FIGS. 13, 14 (21A) as an armrest is not forfeited when the drink cup holder is slid and has a cup in it. All design features of my invention are intended for concurrent use. All cited references have only a single and very restricted use.

Unlike all cited references, my aircraft armrest/flight accessory box FIG. 2 (21A) has a magnetic closing device FIG. 2 (21K, 21L) that is designed to keep the lid closed while the armrest/flight accessory box is in either the upright or inverted (bottom-side-up) position. None of the cited references are designed to work in an inverted position for serving or accommodating back seat passengers as illustrated in my invention in FIGS. 15, 16.

Tools and instruments normally stored inside the aircraft armrest/flight accessory box FIG. 2 (21A) and used by pilots are not mentioned, provided for, or anticipated by any of the cited references. Items frequently used include pens, pencils, pen lights, flash lights, small Allen wrenches (often used for tightening radio knobs that loosen during flight), small screw drivers, small calculators, fuel testers, carbon monoxide testing cards, etc.

My map, chart, and electronic device holder assembly FIG. 1 (18A) is used to secure maps, charts and electronic devices during visual flight (VFR) or instrument flight (IFR) and features a map/paper clamp FIG. 7 (18C) to secure the maps, charts, and electronic devices. The assembly can be rotated or adjusted to any convenient position. This adjustment is made possible through the use of a two piece shaft assembly FIG. 7 (19).

Pilots often focus on maps and charts for lengthy periods of time without looking outside the cockpit, especially during instrument flights. My invention resolves the problems associated with charts and maps sliding off the pilot's lap onto the cockpit floor where they cannot be retrieved easily or safely during flight. Consequently, without my invention, pilots often rely on passengers to help hold maps, charts, and electronic equipment. None of the cited references addressed the above problems or mentioned flight maps, charts, or holders for a GPS, loran, or other navigational equipment. Therefore, none of them anticipated my invention because their art is limited to automobile application.

My invention, being comprised of an aircraft armrest/flight accessory box assembly, console and flat floor support assembly, drink cup holders, adjustable map, chart, and electronic device holder, and mounting platform for multiple place portable intercom devices, as shown in FIGS. 1–5, is designed to be narrow enough for the pilot and co-pilot to provide ample space to allow frequent, immediate, free, and unencumbered access to his flight controls, many of which are located underneath the armrest/flight accessory box. These controls may include, among others, the flap control lever, automatic landings gear over-ride switch, trim control wheel, fuel tank control switch, and seat belts. As shown in FIGS. 13, 14, 15, my invention neither restricts nor impedes the pilot's or co-pilot's immediate access to any of the flight controls whatsoever.

All of the cited references fail to adapt to the space constraints present in small aircraft. Small aircraft typically have approximately three inches between the front seats, which severely limits or restricts the inclusion of auxiliary equipment. Aircraft armrest/flight accessory boxes must be very narrow to fit between the seats, e.g., measure less than the space available, which is approximately three inches. Only an armrest/flight assembly box, and drink cup holder shown in FIGS. 6, 13, 14 meets these requirements.

Nearly all of the components of my invention that rise above the aircraft's floor level and between the seats are less than the space between the front seats FIG. 6. Only my detachable adjustable map, chart, and electronic device holder FIGS. 13, 14 (18), which corresponds to the size of an IFR (Instrument Flight Rules) chart, is wider, but it is designed for immediate and frequent detachment. The structural design of all of the cited references prohibits their use or adaptation in small aircraft, because they could not accommodate such a small space.

A careful review of Wieczorek's et al automotive cup holder patent indicates that this invention is specifically and exclusively for automotive use. Wieczorekls et al art is a cup holder assembly principally composed of two portions, a cup holder portion, and an arm rest portion, both differing in scope and having no application for small aircraft. Wieczorek's et al art offers no other accessories, other than cup holders, and their cup holders are integrally formed with the armrest. Therefore, I conclude Wieczorek et al did not anticipate any of my invention and this art should not serve as a basis for rejecting my claims.

By comparison, my invention, which is a multi-purpose device FIGS. 1–5, is not limited to two accessory features like Wieczorek's et al art i.e., (armrest and cup holders).

By contrast, my invention is designed specifically for its stated purpose i.e., for use in small aircraft. My invention is more complex, in that each accessory has alternate and interrelated uses; My accessories are interdependent, as each accessory relies upon another to be functional; My accessories detach in stages; comprised entirely new component parts which have no precedent; My invention is portable, not a permanently affixed device, as it does not screw or bolt into any part of the aircraft; My invention is intended to be removed or partially detached with each flight of the aircraft; My invention is designed for easy storage when detached; My invention is more narrow and more compact than any of the cited references; and, to the best of my knowledge, my invention has no direct or indirect relationship to any of the cited references nor other existing art, either in appearance or function.

My invention has functions which include an aircraft armrest/flight accessory box assembly FIG. 2 (21A), console and flat floor support assembly, two different types of drink cup holders FIG. 12 (20, 40) giving a total capacity of three or more cups (depending on whether a second optional drink cup holder is used), an adjustable map, chart, and electronic device holder, and mounting platform for multiple place portable intercom devices shown in FIGS. 1–5. Consequently, my invention exceeds the anticipation of Wieczorek's et al art.

Wieczorek et al does not teach a similar flight accessory box assembly for storage of flight tools or navigational aids.

Wieczorek's et al automotive cup holder design did not anticipate the need for a compact multipurpose flight accessory box for navigation tools and equipment. Wieczorek et al does not teach a provision for storage space inside the armrest except for the recessed space into which the cup holder is retracted.

Wieczorek's et al automotive cup holder's design is too wide and bulky for aircraft application and is not collapsible or hinged to fold into a smaller unit to conform to the space limitations which exist between the front seats in a small aircraft.

Wieczorek's et al automotive cup holder uses a pair of spring elements secured between the ends of a pair of pivot arms and the drawer to hold open the cup holders. Unlike Wieczorek's et at automotive cup holder, one of my drink cup holders FIG. 9 (20) is a reversible hinged half circle FIG. 9 (20B, 20F) which must be pull out and opened for use accommodating a small or large drink cup. When not in use, this drink cup holder is normally retracted into the armrest/flight accessory box FIG. 9 (21A), secured only by friction, and has no connecting device to hold it in place.

Unlike Wieczorek's et al automotive cup holder, my retractable drink cup holder assembly FIGS. 7, 8 (20) has three locations FIG. 8 (20J) for screwing a two piece shaft assembly FIG. 7 (19, 19H) into, which allows upper piece of the shaft assembly FIG. 7 (19A, 19B) to be screwed into the threaded locking plate FIG. 7 (39) that tightens into the mounting bracket FIG. 7 (18B) on the underside of the map, chart, and electronic device holder plate FIG. 7 (18).

Wieczorek et al does not teach any secondary purpose for their drink cup holder, nor does he anticipate having a additional, completely independent, and separate detachable optional external armrest/flight accessory box drink cup holder assembly FIGS. 10, 11, 12 (40) which provides expanded storage capacity of three or more additional drink cups. None of the cited references, including Wieczorek's automotive cup holder provided nor anticipated similar additional drink cup storage provisions as an option.

Unlike Wieczorek's et al automotive cup holder, my invention does not include "snubbers" to accommodate varying sizes of beverage containers.

Unlike Wieczorek's et al automotive cup holder and some of the other cited references, my cup holders have no bottom supports.

Wieczorek's et al automotive cup holder is permanently installed and is not intended nor designed for removal or detachment each time the vehicle is used. By contrast, my invention, out of necessity, is intended and designed to be completely portable and partly or wholly detachable, each time the aircraft is used.

Unlike Wieczorek's et al automotive armrest riser (referred to in his detailed description of the preferred embodiment as "a bracket having a base which is either secured to a seat frame or vehicle floor pan") is pivotally mounted to the armrest and permanently affixed to the seat frame or vehicle floor pan. Wieczorek's et al bracket has no similarity to my invention in that I have two completely different designs for my armrest/flight accessory box support assembly FIG. 1 (22, 24) and FIG. 5 (32, 35) to accommodate two radically different aircraft airframe designs. Neither of my aircraft armrest/flight assembly box support assembly designs FIG. 1 (22, 24) and FIG. 5 (32, 35) are permanently mounted, neither design mounts to the seat, neither mounts to the floor pan, and neither design is affixed to the aircraft because both are held in place by spring loaded sleeve latch assemblies FIGS. 1, 5, 6 (30) for rapid and easy removal.

Wieczorek's et al art makes no reference to a mounting platform for intercom devices as their art is limited to automotive cup holders.

The hinged phone bracket for vehicles claimed by Troy have neither relevance nor application to aircraft. In fact, the operation of mobile telephones is legally forbidden during flight in small aircraft. Troy's art is limited to vehicle phones.

My invention serves multiple purposes and functions, one being a mounting platform for a multiple place portable intercom device FIG. 2 (17), which is held in place only by Velcro. The intercom device being shown in FIGS. 2, 13, 14, 15 is hardwired. Such intercom devices are used exclusively to allow passengers to listen in on radio communications between the pilot and co-pilot, air traffic controller, and other airplanes and have conversation among themselves, in spite of the loud engine noise present in the cockpit. There is no need for comparable devices for use in automobiles because automobiles operate much more quietly. To my knowledge, no such devices for automobiles exist.

In the background of the Doughty et al invention, it was indicated that the convertible floor console and auxiliary seat for an automotive vehicle is "related generally to a console for use in automotive vehicle front seating arrangements" and serves as an automobile auxiliary seat, armrest, and cup holder.

As designed, Doughty's et al invention cannot be used in small aircraft since it is neither safe, practical, nor legal for unauthorized auxiliary seating to be added to FAA approved factory production model aircraft. Securing approval for such a structural modification is extremely remote, probably impossible.

Being distinctly different than all cited references, my invention is not permanently affixed to the aircraft; My invention does not bolt or screw into any structural part or surface of the aircraft, thereby compromising its structural integrity; My invention does not compromise or interfere in any way with the pilot's or co-pilot's performance or with access to aircraft controls, and it sits on the floor of the aircraft held temporarily, but securely in place, by a sleeve latch assembly FIG. 3 (30).

Schiff's extendible vehicle tray method and apparatus was designed to provide a method to access an ashtray, cup holder and storage bin for occupants of automobiles or other motor vehicles.

Schiff's art is very limited in scope and cannot be adapted for use in small aircraft due to its design and size. Such a large device would restrict boarding of the aircraft as well as interfere with critical flight controls.

Spykerman's expandable container holder is not specifically attached to a permanent surface. Unlike my invention, Spykerman's expandable container holder has a support platform or bail to support beverage cans by their bottom. My drink cup holders have no such bail or support platform and unlike Spykerman's expandable container holder, my optional external drink cup holder FIGS. 10, 11, 12 fits on top of the armrest and is completely detached after each use.

Spykerman's expandable container is limited to two drink cans or cups while the capacity of my drink cup holders is greater. Spykerman's art has no application for aircraft because it adds to the on-board storage problem and could become hazardous, since it is not secured to any surface. Spykerman's container would be have to be secured like a piece of luggage, thereby, rendering it inappropriate for use in an aircraft. Further, there are no structural design similarities between Spykerman's art and my invention.

The same objections expressed above apply to Spykerman's et al storage compartment with cover. Although Spykerman et al added a catch basin for spilt liquids, I have nothing similar to claim in my invention.

BRIEF SUMMARY OF THE INVENTION

The purpose of my newly invented armrest is to address the performance impeding problem of pilot and passenger fatigue when using small aircraft without a center armrest for the pilot's right arm and the front seat passenger's left arm. As an interrelated multiple purpose device, the armrest enables the pilot to operate the aircraft more comfortably, safely, and effectively while sharing the same benefits with the passengers. The armrest also serves as a Flight Accessory Box, which likewise, also has several other important functions.

The purpose for designing two models of a support assembly, i.e., a console and flat floor, is to accommodate aircraft models with either design.

The Flight Accessory Box has multiple purposes. It addresses the problem of pilot disorganization due to the lack of suitable and convenient storage devices. The Flight Accessory Box provides a convenient and readily accessible storage bay for navigational aids, and tools and accessories that are necessary during flight. These include, but are not limited to, pens, pencils, eyeglasses, sunglasses, flashlights (for night flights), Allen wrenches (for radio knobs that sometime come off during flight), and screw drivers, wrenches, tape, batteries, etc.

The Flight Accessory Box Assembly is attachable and detachable and provides for better organization of limited cockpit space by providing a mounting platform for positioning and supporting a multiple place portable intercom device, which is often desirable and necessary for pilots, copilots, and passengers. Serving as a cockpit organizer, this device provides an excellent, convenient, and easily accessible intercom device holder which prevents the intercom from being kicked around on the floor, the wires from becoming entangled preventing the pilot and/or copilot distraction.

The Flight Accessory Box Assembly provides convenient housing for the Retractable Drink Cup Holder. Both the retractable and external drink cup holders address the present problems of having no place to put cups, as well as pilot distraction, from spillage or breakage. This new device is convenient and useful for both occupants of the front and back seats. The Retractable Drink Cup Holder accommodates both standard size and large cups by simply reversing the ends being inserted into the Flight Accessory Box. Hinges allow the Retractable Drink Cup Holder to be folded for insertion into the Flight Accessory Box. When flipped over or rotated in the reverse position the Flight Accessory Box and retractable drinks cup holder provides convenient storage facilities and beverage holders for rear seat passengers.

The Retractable Drink Cup Holder addresses problems of safety and pilot disorganization in small aircraft with reference to open beverages during flight. The Retractable Drink Cup Holder has interrelated purposes. It functions as the Mounting Platform for the Adjustable Map, Chart, and Electronic Device Holder and has three threaded locations for mounting this device.

The external drink cup holder is an optional device that fits onto the topside of the Flight Accessory Box and provides drink cup holder space for additional passengers.

The purpose of the Mounting Platform for Multiple Place Portable Intercom Devices which is located on the rear of the Aircraft Armrest/Flight Accessory Box is to address the problems of small aircraft not having a suitable place for this optional accessory equipment. This newly invented Mounting Platform provides for a new and unique method for positioning and supporting portable intercom devices so that cockpit organization is improved. By using this Mounting Platform the portable intercom device becomes more secure, easier to reach and adjust, and the wires are less likely to become entangled. Pilot distractions are thereby reduced resulting in a safer flight.

The purpose of the Adjustable Map, Chart, and Electronic Device Holder is to serve as a cockpit organizer. This device is adjustable, as well as detachable, allowing it to be rotated in different directions. It conveniently holds, within close and direct view of the pilot, the necessary navigational maps, charts, electronic devices (including computers, portable GPS's, moving maps, lorans, etc.).

BRIEF DESCRIPTION OF SEVERAL VIEWS OF THE DRAWING

FIG. 15 is a perspective view of a typical small aircraft cabin with the front passenger seat removed, showing the Armrest/Flight Accessory Box Assembly, Retractable Drink Cup Holder, Map, Chart, and Electronic Device Holder, and Mounting Platform for a Standard Multiple Place Portable Intercom Devices with Head Sets, shown in the rear position with the Flight Accessory Box Assembly Cover open.

FIG. 16 is a perspective view of a typical small aircraft cabin with the front passenger seat removed, showing the Armrest/Flight Accessory Box Assembly, Retractable Drink Cup Holder, and Optional External Drink Cup Holder, in the flipped position.

DETAILED DESCRIPTION OF THE INVENTION

Figure 1:
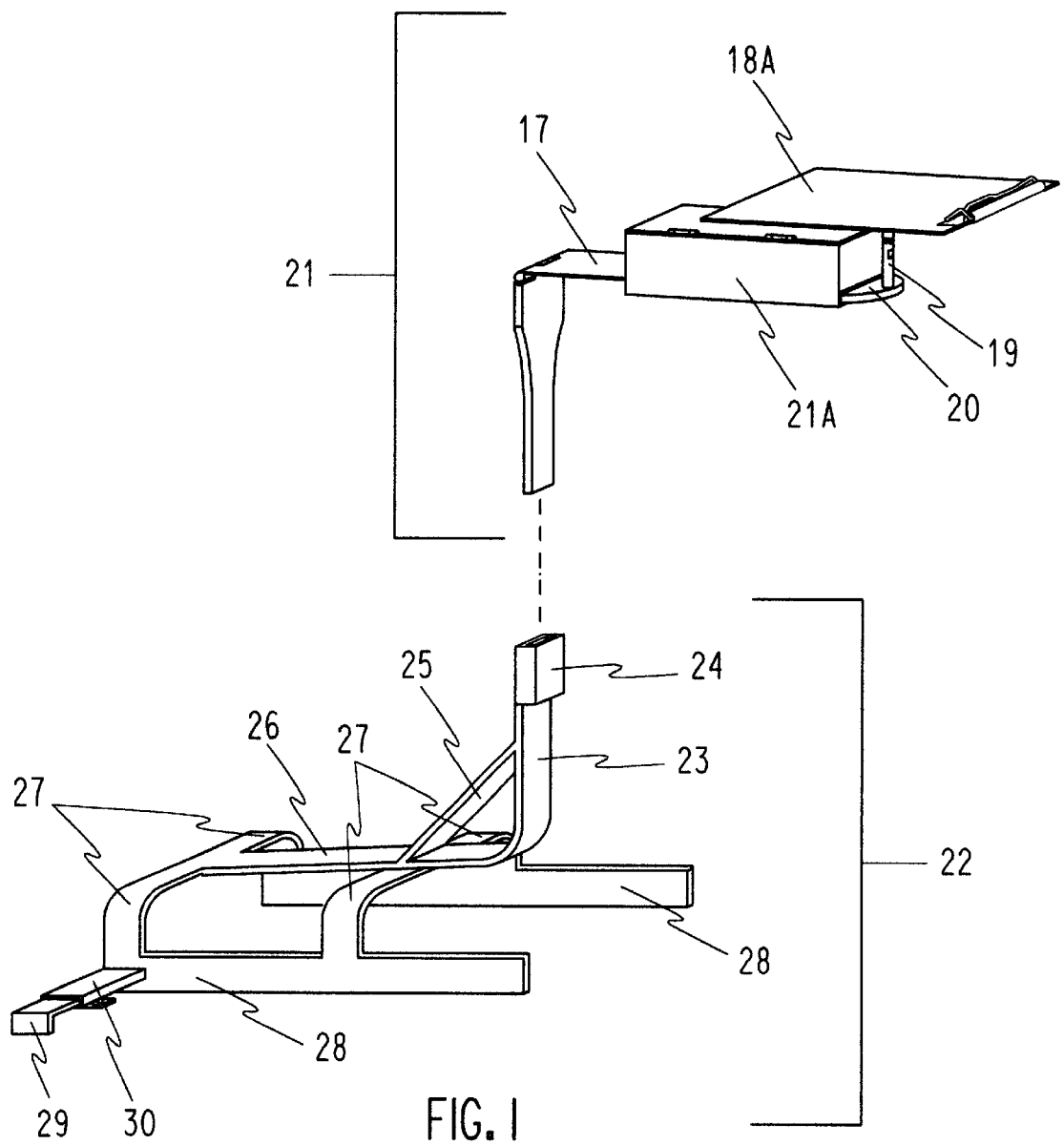
FIG. 1 shows a perspective view of the Armrest/Flight Accessory Box Assembly, with a welded or cast Floor Console Armrest Support Assembly, Retractable Drink Cup Holder, Map, Chart, and Electronic Device Holder, Two Piece Shaft Assembly, and Mounting Platform for Standard Multiple Place Portable Intercom Devices shown in the forward detached position.

Preferred embodiments of the present invention will now be described in greater detail and will be better understood when read in conjunction with the following drawings in which "like parts" bear "like numerals" throughout the several views:

FIG. 1 shows a perspective view of the Armrest/Flight Accessory Box Assembly 21 shown in the forward detached position, with a welded or cast Floor Console Armrest/Flight Accessory Box Support Assembly 22, both 21 and 22 being made of metal, plastic or other material. The Armrest/Flight Accessory Box Assembly consists of a Armrest/Flight Accessory Box 21A, Retractable Drink Cup Holder 20, Map, Chart, and Electronic Device Holder Plate 18A, Two Piece Shaft Assembly 19, and Mounting Platform for Standard Multiple Place Portable Intercom Devices 17. The Floor Console Armrest/Flight Accessory Box Support Assembly 22 consists of a Riser 23, Arm Rest Receiver 24, Arm Rest Brace 25, Center Console Rest 26, four Console Cross Brackets 27, two Floor Braces 28, Sleeve Latch Arm 29, with two Welded Sleeve Latch Assemblies 30.

Figure 2:
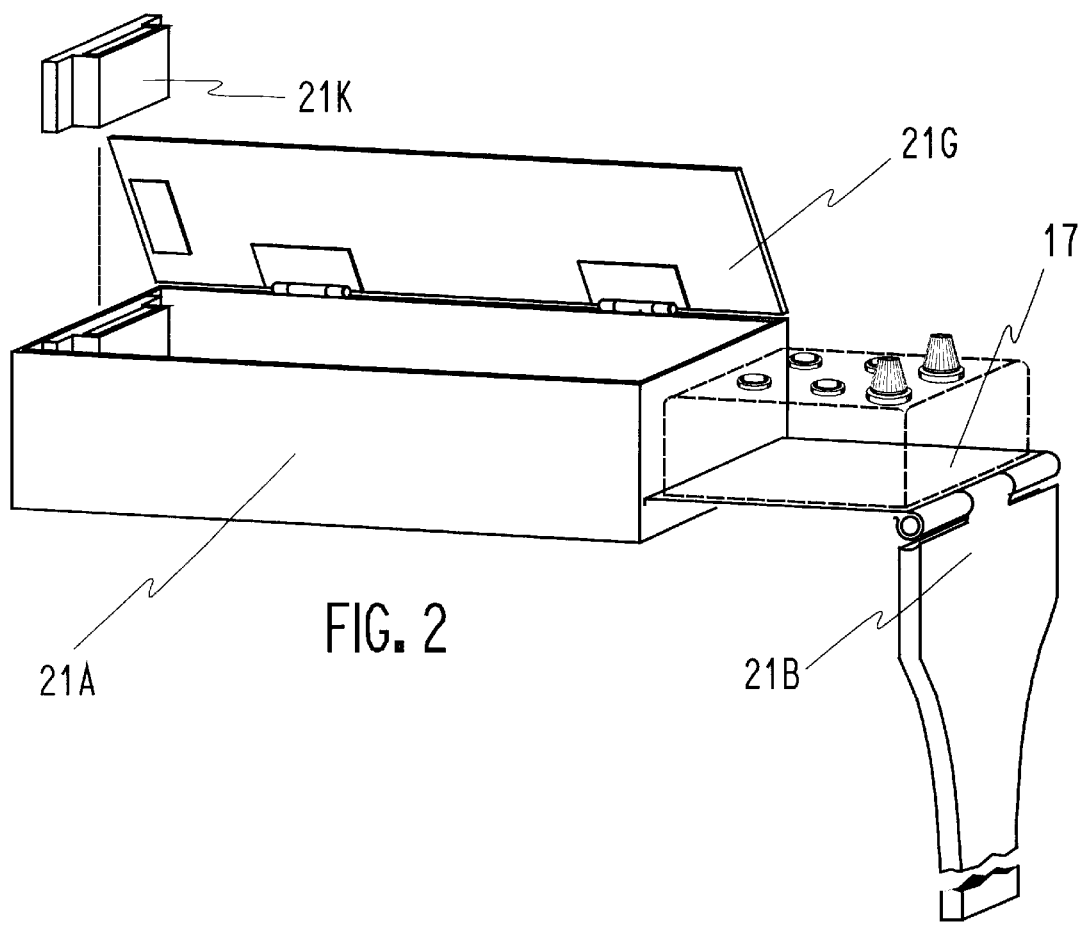
FIG. 2, 2A and 2B are detailed views is a detailed views of the welded or cast Armrest/Flight Assembly Box with Mounting Platform for Multiple Place Portable Intercom Devices and how the intercom device is positioned, and the Armrest Riser Support, with detail showing how the Flight Accessory Box attaches to the Armrest Riser Support.
Figure 2A:
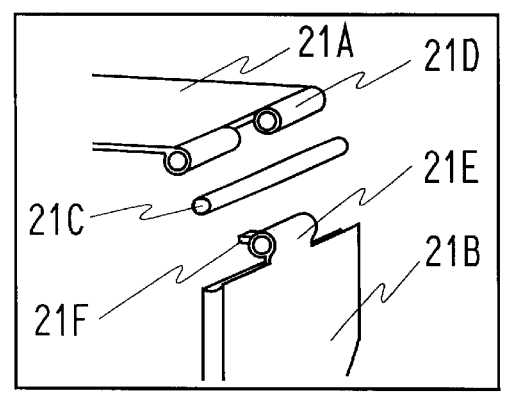
Figure 2B:
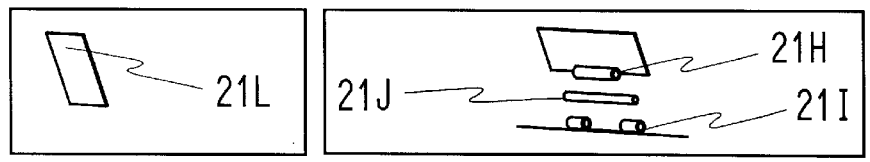

FIG. 2, 2A and 2B are detailed views of the Armrest/Flight Accessory Box 21A with Mounting Platform for Standard Multiple Place Portable Intercom Devices 17, Armrest Riser Support 21B, with a detail of how the Flight Accessory Box 21A attaches to the Armrest/Flight Accessory Box Riser Support 21B using a Pin 21C through the hinges 21D & 21E. The riser support 21B has a welded or cast stop 21F centered on the hinge 21E to keep the armrest 21A level when in the forward position.

The Cover 21G to the Flight Accessory Box 21A is a one-piece unit with two hinges 21H that fit into the hinges 21I on the Flight Accessory Box 21A by the use of Pins 21J. The Flight Accessory Box has a standard magnetic closure device 21K and metal pad 21L attached by super glue.

Figure 3:
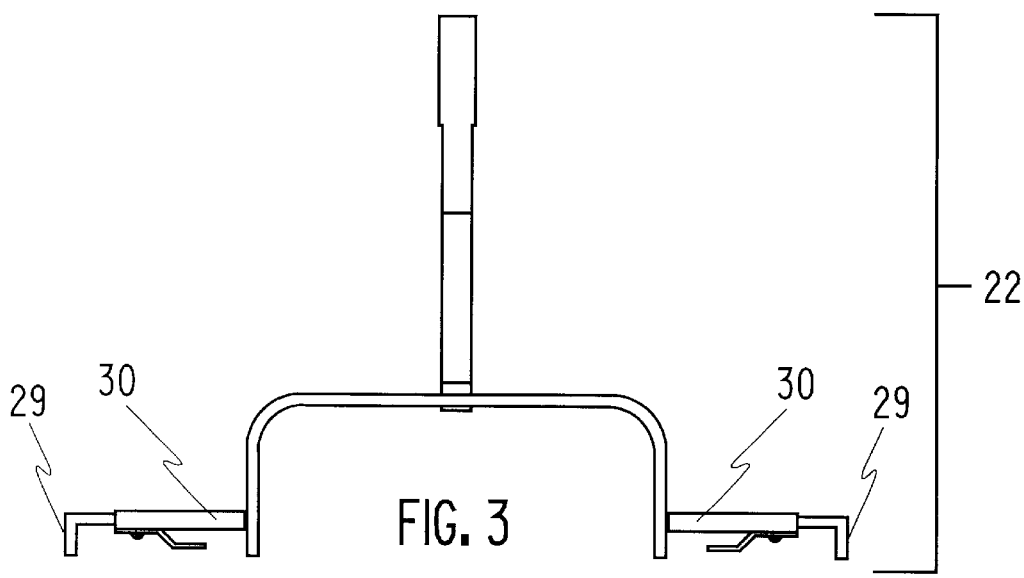
FIG. 3 and 3A are is a cross-sectional views showing the Console Armrest Support Assembly with detail of the Sleeve Latch Assembly and track hookup using a Sleeve Latch Assembly that fits on the Sleeve Latch Arm, allowing the Sleeve Latch Assembly to fit over and latch underneath the T-Shaped Seat Tracks.
Figure 3A:
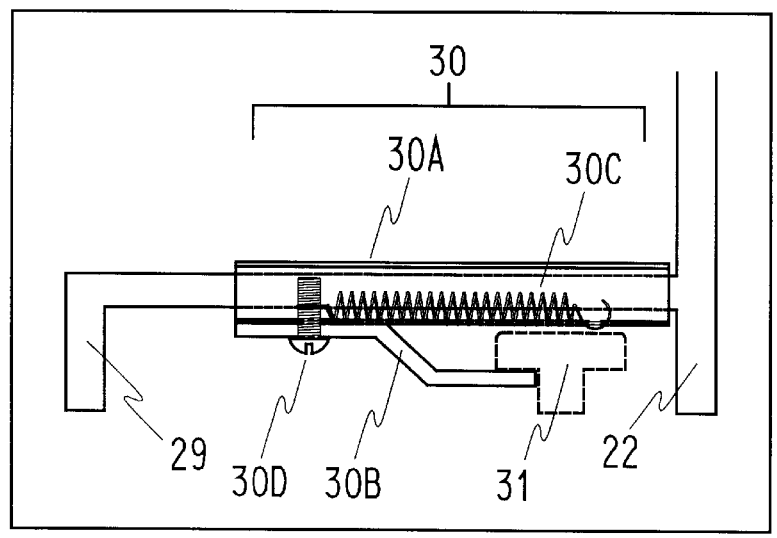

FIG. 3 and 3A are cross-sectional views showing the Console Armrest/Flight Accessory Support Assembly 22 with detail of the Sleeve Latch Assembly 30 and track hookup 31. The welded Sleeve Latch Assembly consists of a Sleeve 30A, Latch 30B, Spring 30C, that fits on the Sleeve Latch Arm 29, and Screw 30D. This allows the Sleeve Latch Assembly to fit over and latch underneath the T-Shaped Seat Tracks.

Figure 4:
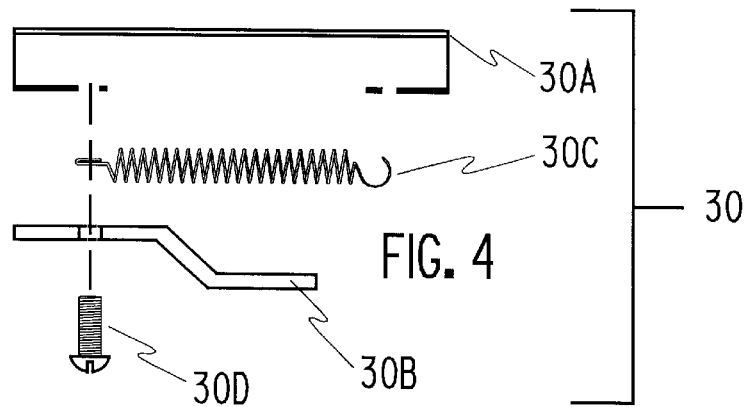
FIG. 4 is an exploded view showing the details of the Sleeve, Latch, Spring, Screw, and how they go together.

FIG. 4 is an exploded view showing the details of the Sleeve 30A, Latch 30B, Spring 30C, Screw 30D, and how they go together.

Figure 5:
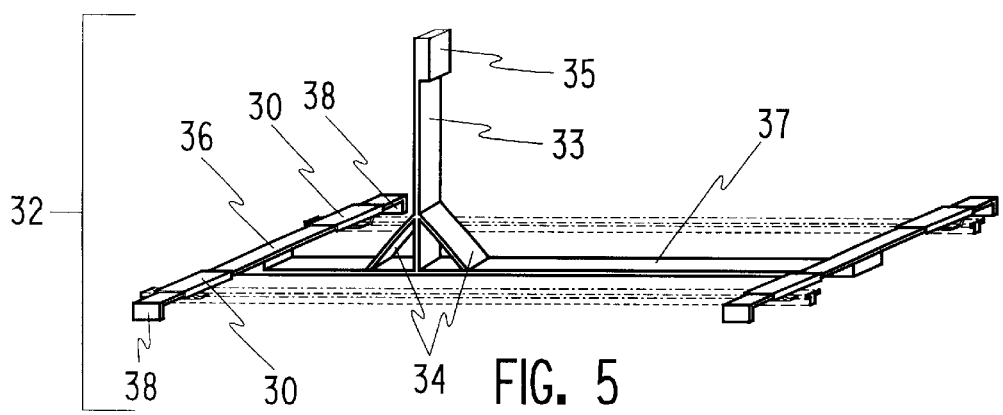
FIGS. 5 and 5A are prospective views of the welded or cast Flat Floor Armrest Support for a typical small aircraft that does not have a raised center console.
Figure 5A:
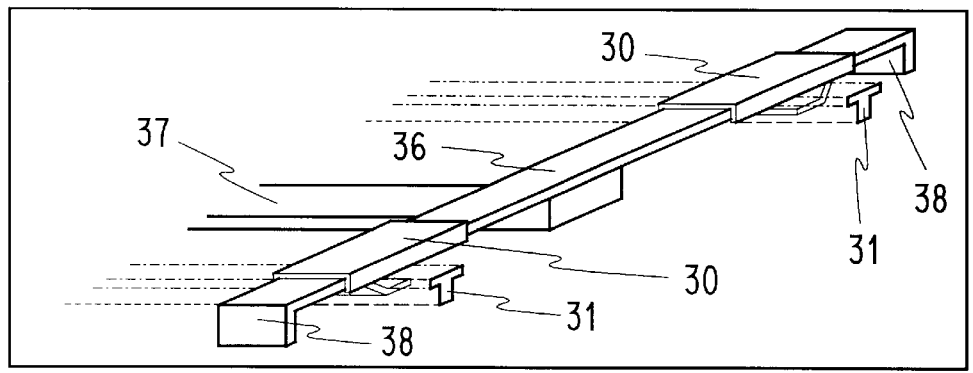

FIG. 5 and 5A are perspective view of the Flat Floor Armrest/Flight Accessory Box Support Assembly 32 consisting of a Flat Floor Riser 33, two Flat Floor Riser Braces 34, Arm Rest Receiver 35, two Flat Floor Cross Arms 36, Flat Floor Center Stiffener 37, four Flat Floor Sleeve Latch Arms 38, with four welded Sleeve Latch Assemblies 30, and a close-up view of the T-Shaped Seat Tracks 31.

Figure 6:
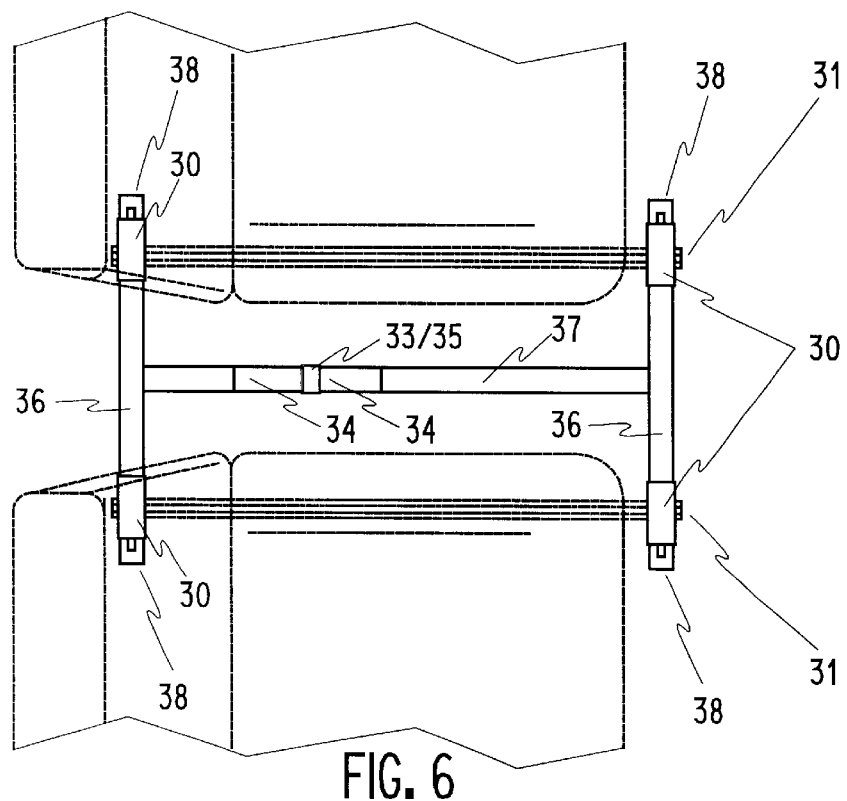
FIG. 6 is a floor plan view of the Flat Floor Armrest Support and T-Shaped Seat Tracks.

FIG. 6 is a floor plan view of the Flat Floor Armrest/Flight Accessory Box Support Assembly FIG. 5 (32) and T-Shaped Seat Tracks 31 consisting of a Flat Floor Riser 33, Arm Rest Receiver 35, two Flat Floor Riser Braces 34, two Flat Floor Cross Arms 36, Flat Floor Center Stiffener 37, four Flat Floor Sleeve Latch Arms 38, with four welded Sleeve Latch Assemblies 30.

Figure 7A:
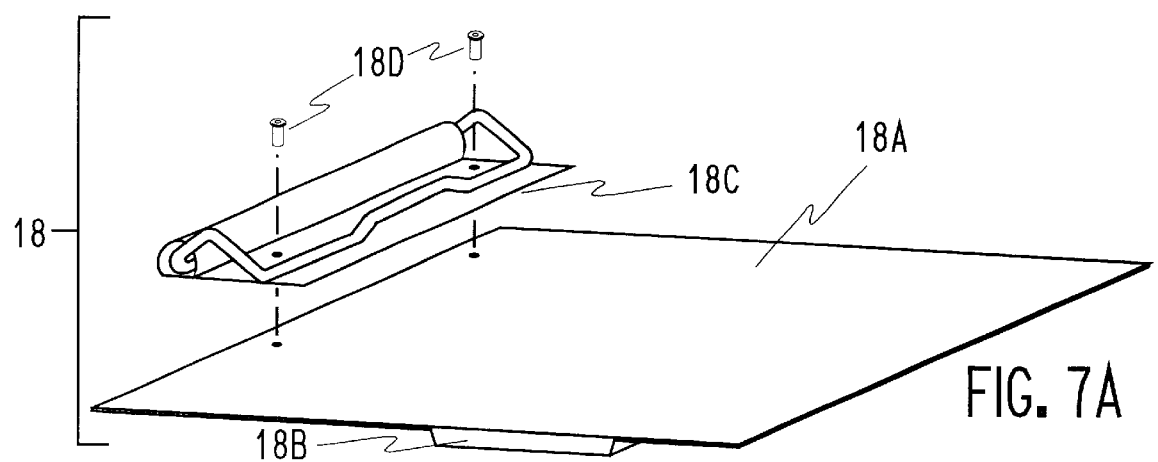
FIG. 7, 7A and 7B are perspective and exploded views showing the details of the Retractable Drink Cup Holder Assembly, Two Piece Shaft Assembly, Map, Chart, and Electronic Device Holder Assembly.
Figure 7B:
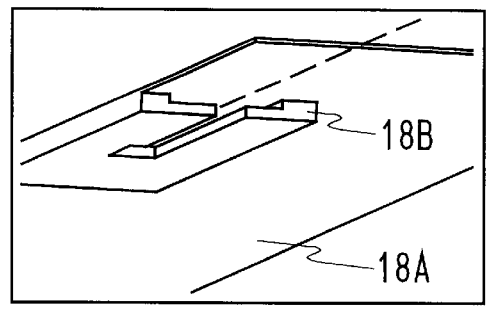
Figure 7:
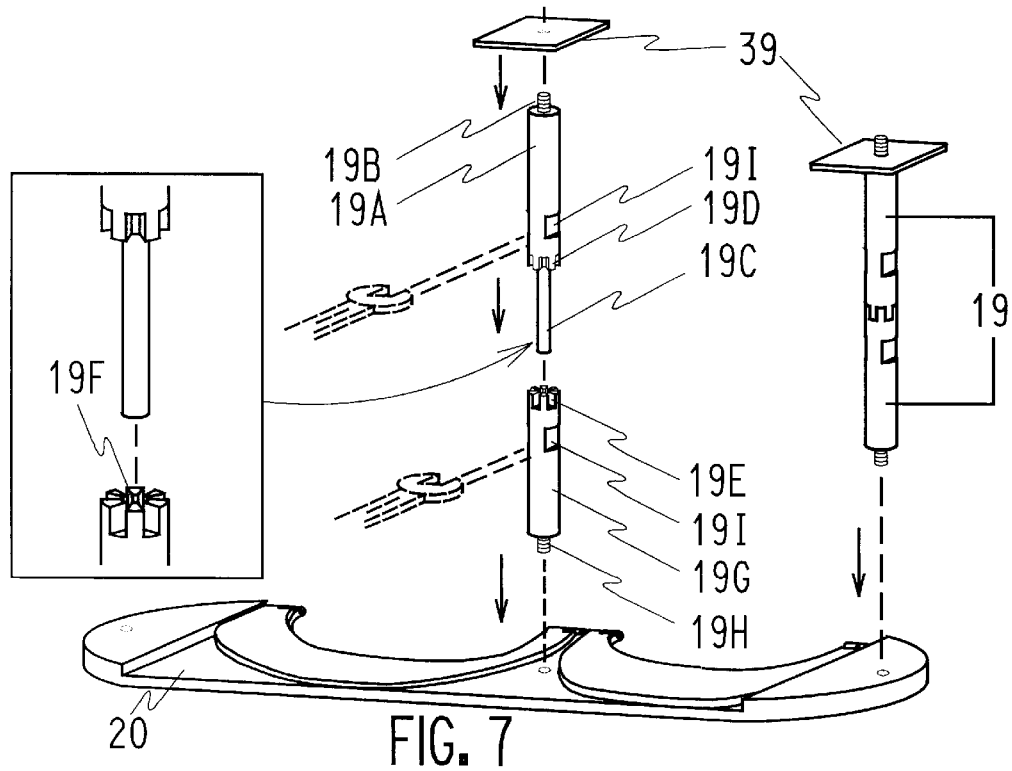

FIG. 7, 7A and 7B are perspective and exploded views showing the details of the Retractable Drink Cup Holder Assembly 20 welded or cast Map, Chart, and Electronic Device Holder Assembly 18 consisting of a Map, Chart, and Electronic Device Holder Plate 18A, Mounting Bracket 18B welded or cast to the bottom side of 18A. A standard map/paper clamp 18C attaches to the top of 18A with two Rivets 18D. A Threaded Locking Plate 39 sits upon a Two Piece Shaft Assembly 19, which slides and locks into the Mounting Bracket 18B of 18A by twisting 19. The Two Piece Shaft Assembly 19, screws into one of three locations on the Retractable Drink Cup Holder Assembly 20 also shown in FIG. 8 (20J). The Two Piece Shaft Assembly 19 consists of a shaft 19A with a threaded shaft 19B for the Locking Plate 39 at one end and a smooth shaft 19C at the other. The end with the smooth shaft 19C has teeth 19D that will match with the teeth 19E and hole 19F drilled in the shaft 19G that attaches to the Retractable Drink Cup Holder Assembly 20 with a threaded shaft 19H. Each part of the Shaft Assembly has a notch 19I so that a standard wrench may be used to loosen or tighten the Shaft Assembly.

Figure 8:
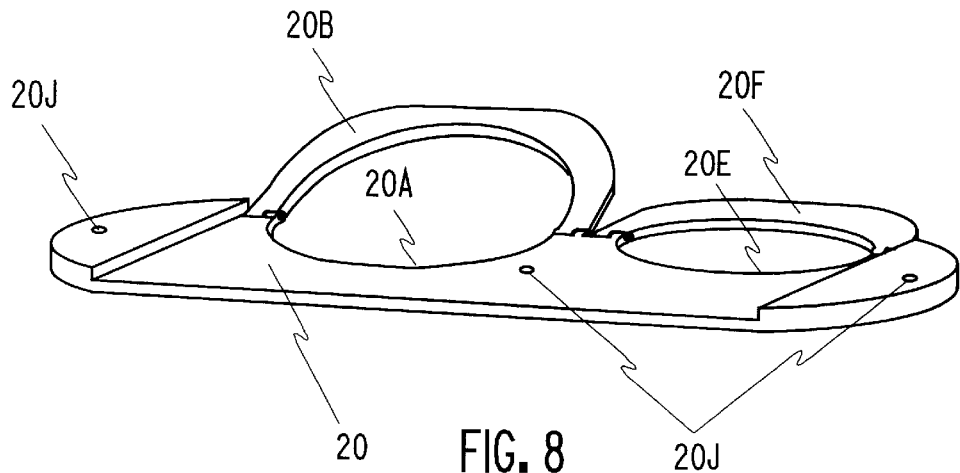
FIG. 8 and 8A are perspective and exploded views showing the Retractable Drink Cup Holder Assembly, with details for standard and large size drink cups.
Figure 8A:
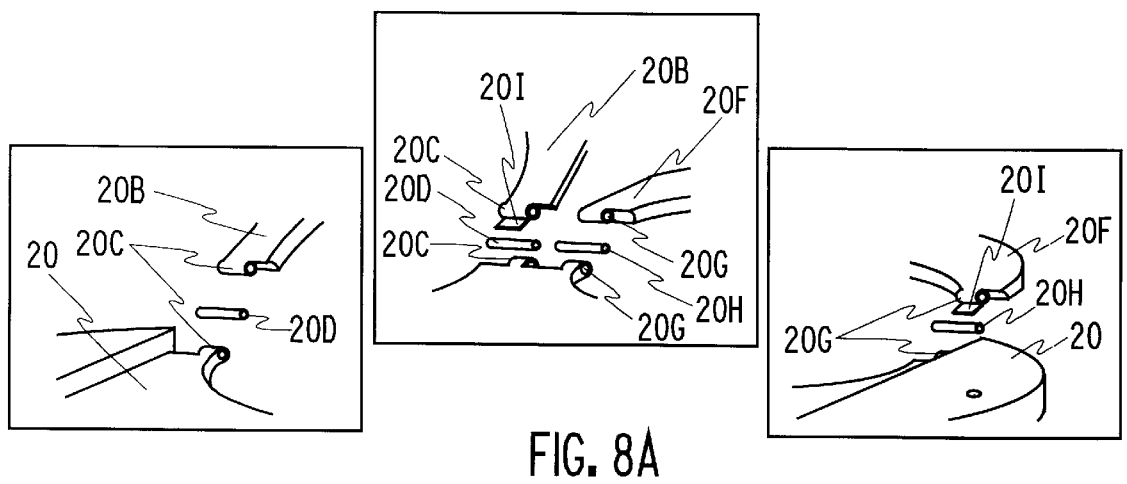

FIG. 8 and 8A show shows the Retractable Drink Cup Holder Assembly 20 with details consisting of a half circle for a large size drink cup cut into the plate 20A. A large drink size half circle Holder 20B attaches to the assembly through built-in hinges 20C with a pin 20D at each end, so that it folds over onto itself for storage. The Retractable Drink Cup Holder Assembly 20 also has a standard drink cup size half circle cut into the plate 20E. A standard drink cup size half circle Holder 20F attaches to the assembly through built-in hinges 20G with a pin 20H at each end so that it also it folds over onto itself for storage. Each half circle Holder also has a stop 20I built into it so that it will lay flat with the holder assembly. The Retractable Drink Cup Holder Assembly 20 also has three locations 20J drilled and tapped to hold the Map, Chart, and Electronic Device Holder Assembly FIG. 7 (18).

Figure 9:
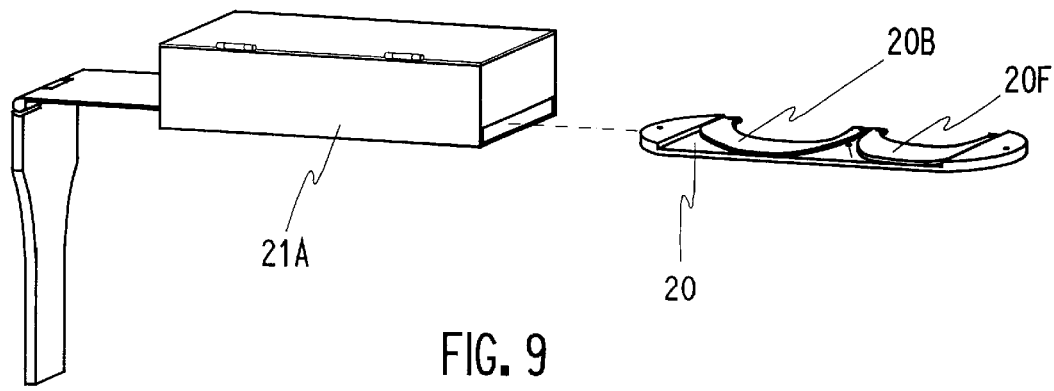
FIG. 9 is a perspective view of the Armrest/Flight Accessory Box in the forward position, and the Reversible Drink Cup Holder Assembly, in the folded position Ad exploded out from the Flight Accessory Box.

FIG. 9 is a perspective view of the Armrest/Flight Accessory Box 21A in the forward position, and the Reversible Drink Cup Holder Assembly 20 with the Half Circle Holders 20B & 20F, in the folded position and exploded out from the Armrest/Flight Accessory Box 21A.

Figure 10:
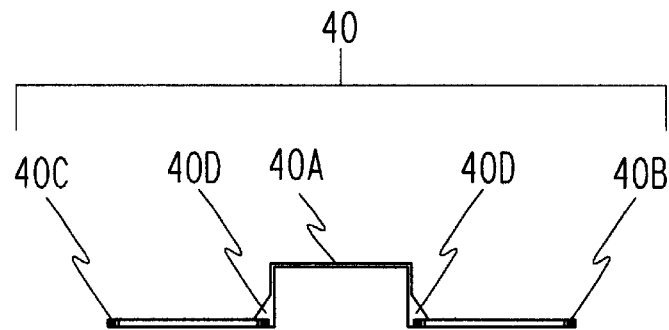
FIG. 10 is a cross-sectional view of the Optional External Drink Cup Holder Assembly that fits over the Flight Accessory Box.

FIG. 10 is a cross-sectional view of the optional External Armrest/Flight Accessory Box Drink Cup Holder Assembly 40, consisting of a single piece of cast metal, plastic or other material. The Optional External Armrest/Flight Accessory Box Drink Cup Holder Assembly 40 has a Bracket 40A formed to fit over the Flight Accessory Box 21A with Large Drink Cup Holder 40B cut out on one end, and a Standard Drink Cup Holder 40C cut out on the other. Each Drink Cup Holder has two supports 40D to give the holders stability.

Figure 11:
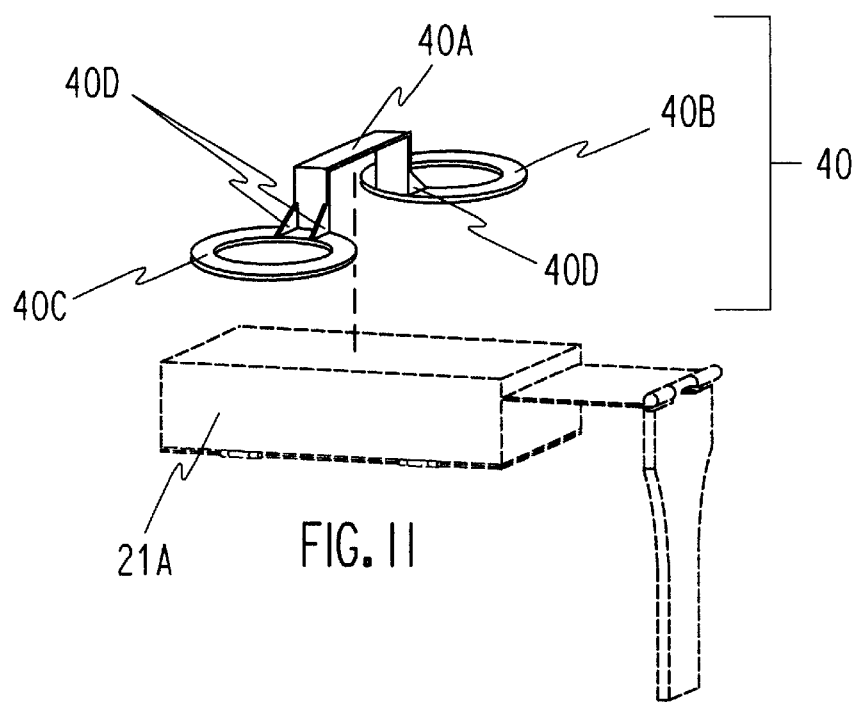
FIG. 11 is a perspective view of the Armrest/Flight Accessory Box Assembly flipped over in the rear position, showing the Optional External Flight Accessory Box Drink Cup Holder exploded off the Flight Accessory Box.

FIG. 11 is a perspective view of the Armrest/Flight Accessory Box 21A flipped over in the rear position, showing the Optional External Armrest/Flight Accessory Box Drink Cup Holder Assembly 40 exploded off the Armrest/Flight Accessory Box 21A with a view of the Bracket 40A, a Large Drink Cup Holder 40B, a Standard Drink Cup Holder 40C, and two supports 40D.

Figure 12:
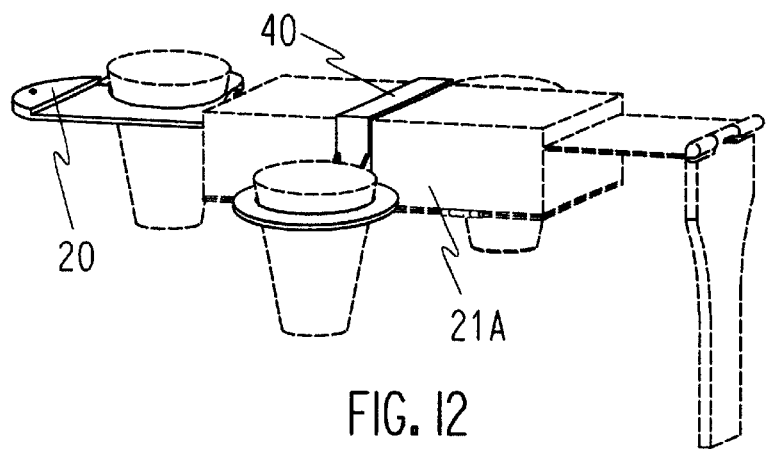
FIG. 12 is a perspective view of the Armrest/Flight Accessory Box Assembly flipped over in the rear position, showing how the Optional External Drink Cup Holder fits on the Flight Accessory Box and how the Retractable Drink Cup Holder Assembly is used in the flipped or rear position.

FIG. 12 is a perspective view of the Armrest/Flight Accessory Box 21A flipped over in the rear position, showing how the Optional External Armrest/Flight Accessory Box Drink Cup Holder 40 with standard size drink cups inside, fits on the Armrest/Flight Accessory Box 21A, and how the Retractable Drink Cup Holder Assembly 20 is used in the flipped over rear position.

Figure 13:
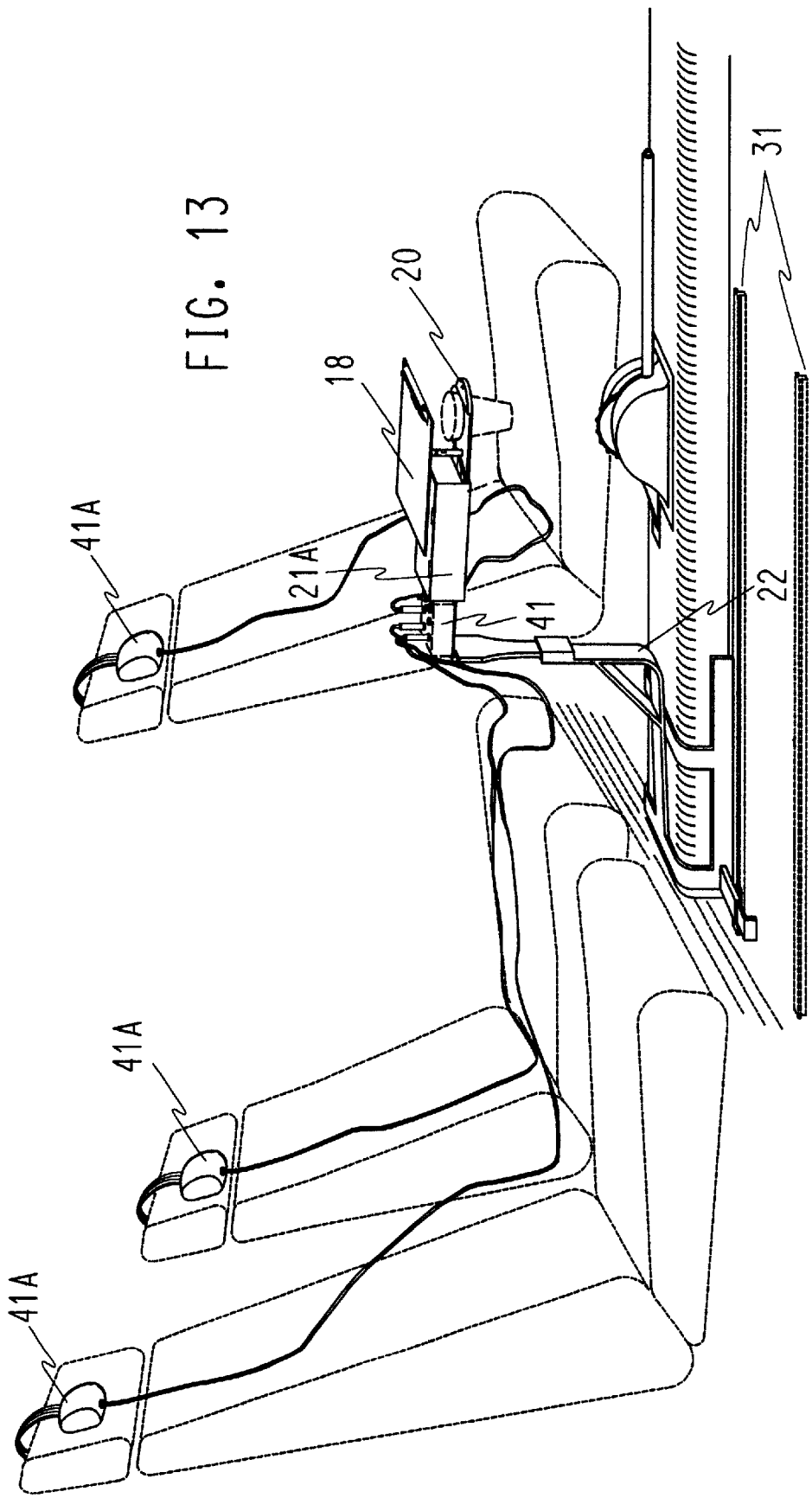
FIG. 13 is a perspective view of a typical small aircraft cabin with the front passenger seat removed, showing the Armrest/Flight Accessory Box Assembly with the Floor Console Armrest Support Assembly, Retractable Drink Cup Holder Assembly, Map, Chart, and Electronic Device Holder Assembly, and Mounting Platform for Standard Multiple Place Portable Intercom Devices with Head Sets, shown in the forward position.

FIG. 13 is a perspective view of a typical small aircraft cabin, with the front passenger seat removed, showing the Armrest/Flight Accessory Box 21A shown in the forward position, with the Floor Console Armrest/Flight Accessory Box Support Assembly 22, T-Shaped Seat Tracks 31, Retractable Drink Cup Holder Assembly 20 with a standard size drink cup inside, a Map, Chart, and Electronic Device Holder Assembly 18, a Standard Multiple Place Portable Intercom Device 41 positioned upon its Mounting Platform, and Standard Head Sets 41A.

Figure 14:
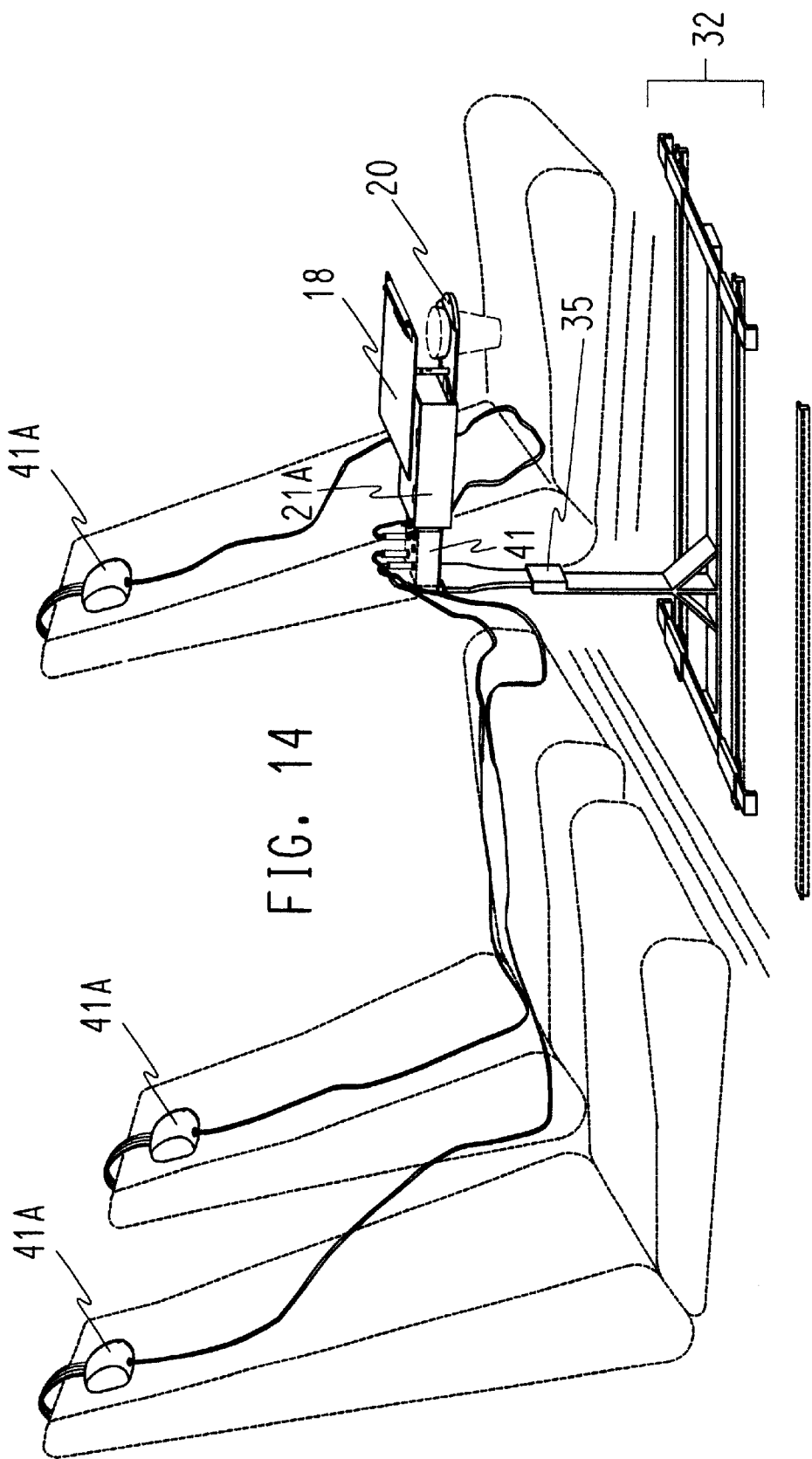
FIG. 14 is a perspective view of a typical small aircraft cabin with the front passenger seat removed, showing the Armrest I Flight Accessory Box Assembly with Flat Floor Armrest Support Assembly, Retractable Drink Cup Holder Assembly, Map Chart, and Electronic Device Holder, and Mounting Platform for Standard Multiple Place Portable Intercom Devices with Head Sets, shown in the forward position.

FIG. 14 is a perspective view of a typical small aircraft cabin, with the front passenger seat removed, showing the Armrest/Flight Accessory Box 21A shown in the forward position fitted into the Arm Rest Receiver 35 of the Flat Floor Armrest/Flight Accessory Box Support Assembly 32, Retractable Drink Cup Holder 20 with a standard size drink cup inside, a Map, Chart, and Electronic Device Holder Assembly 18, a Standard Multiple Place Portable Intercom Device 41 positioned upon its Mounting Platform, and Standard Head Sets 41A.

FIG. 15 is a perspective view of a typical small aircraft cabin, with the front passenger seat removed, showing the Armrest/Flight Accessory Box 21A in the reversed rear position with the Flight Accessory Box Assembly Cover 21G open, Retractable Drink Cup Holder 20 with a standard size drink cup inside, a Standard Multiple Place Portable Intercom Device 41 positioned upon its Mounting Platform, and Standard Head Sets 41A.

FIG. 16 is a perspective view of a typical small aircraft cabin, with the front passenger seat removed, showing the Armrest/Flight Accessory Box 21A in the flipped position, Retractable Drink Cup Holder 20 with a standard size drink cup inside, and Optional External Armrest/Flight Accessory Box Drink Cup Holder 40 with drink cups inside.

What I claim as my invention is:

1. An aircraft armrest and cockpit organizer assembly comprising:

a flight accessory box having two opposing elongated sides and two opposing short sides, wherein a top cover is hinged to one of the elongated sides, one of the short sides has a mounting platform means for supporting a multiple portable intercom device, a riser having one end hingedly attached to the mounting platform means and extending perpendicularly and vertically from the platform means, and the other end of the riser is attached to a floor support, the other short side has a retractable cup holder assembly, whereby an adjustable map holder having a shaft assembly is supported on the cup holder assembly, and an external cup holder for placement over the box when the top cover is in a closed position.

2. The assembly of claim 1, wherein the box is a material constructed from one of the following groups consisting of metal, plastic, wood, and aluminum.

3. The assembly of claim 1, wherein the box is able to be positioned to serve either the front or rear seat passengers.

4. The assembly of claim 1, wherein the floor support is a console floor support assembly secured to T-shaped seat tracks of a low winged aircraft with a sleeve latch assembly.

5. The assembly of claim 1, wherein the floor support is a flat floor support assembly secured to T-shaped seat tracks of a high winged aircraft with a sleeve latch assembly.

6. The assembly of claim 1, wherein the external cup holder is a material constructed from one of the following groups consisting of metal, plastic, and paper.

7. The assembly of claim 1, wherein the portable intercom device is attached to the mounting platform means by hook and loop fasteners.

* * * * *